United States Patent
Nishimura et al.

(10) Patent No.: US 6,456,791 B1
(45) Date of Patent: Sep. 24, 2002

(54) MOVING MECHANISM

(75) Inventors: Syunji Nishimura, Saitama (JP); Masaya Nozawa, deceased, late of Saitama (JP), by Mieko Nozawa, legal representative; Yukio Noguchi, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/917,878

(22) Filed: Jul. 31, 2001

(30) Foreign Application Priority Data

Aug. 1, 2000 (JP) ..................................... 2000-233444

(51) Int. Cl.$^7$ .............................................. G03B 17/04
(52) U.S. Cl. ......................................... 396/72; 396/349
(58) Field of Search ........................... 396/72, 79, 349; 359/694, 699, 700, 701, 829, 704, 823

(56) References Cited

U.S. PATENT DOCUMENTS

| | | |
|---|---|---|
| 5,802,404 A | 9/1998 | Nishimura |
| 6,120,865 A * | 9/2000 | Nomura et al. ......... 359/694 X |

FOREIGN PATENT DOCUMENTS

JP  10-31150  2/1998

* cited by examiner

Primary Examiner—W. B. Perkey
(74) Attorney, Agent, or Firm—Leydig, Voit & Mayer, Ltd.

(57) ABSTRACT

A moving mechanism for a cylinder is provided, in which a projection and groove are engaged by relative movement different from that of a helicoid mechanism and movement of inner and outer cylinders relative to each other can be freely set. In the moving mechanism, a first helicoid thread is helically formed on the inner surface of an intermediate cylinder, a second helicoid thread that threadably engages with the first helicoid thread is helically formed on the outer surface of a movable cylinder, and the intermediate cylinder is rotated so the movable cylinder is moved relative to the intermediate cylinder. A projection is formed on the outer surface of the movable cylinder and a groove engageable with the projection is formed in the inner surface of the intermediate cylinder. In a range where the first and second helicoid threads threadably engage with each other upon relative movement of the movable cylinder, the groove is formed parallel to the first helicoid thread. In a range where the first and second helicoid threads do not threadably engage with each other, the groove has a nonparallel region not parallel to at least the first helicoid thread.

4 Claims, 4 Drawing Sheets

MOVING MECHANISM

BACKGROUND OF THE INVENTION

1. Field of the Invention

The present invention relates to a moving mechanism for moving a plurality of inner and outer cylinders provided in a multiple manner in the axial direction relative to each other and, more particularly, to a moving mechanism used in, e.g., a lens barrel for a camera.

2. Related Background Art

Conventionally, as a mechanism for moving a plurality of cylinders in the axial direction relative to each other, a helicoid mechanism is known as described in Japanese Patent Laid-Open No. 10-31150, in which either one of a root and crest is helically formed on the inner surface of an outer cylinder, and the other one is formed on the outer surface of an inner cylinder. One of the outer and inner cylinders is rotated with respect to the other, thereby transforming a rotary motion into a rectilinear motion.

According to the helicoid mechanism described in this reference, a large-width portion is formed in part of the root by widening the width of the root. The amount of movement of the outer and inner cylinders relative to each other is increased by using the large-width portion.

In the above helicoid mechanism, the degree of freedom of the movement of the outer and inner cylinders relative to each other is small. More specifically, in the above helicoid mechanism, it is certain that the amount of movement of the outer and inner cylinders relative to each other can be increased with respect to rotation of the outer or inner cylinder by utilizing the large-width portion formed in part of the root. As shown in FIG. 6 of this reference, since the crest (34b) is formed adjacent to the root, the amount of increase in the relative movement is limited to a certain level due to the position of the crest and the like, and becomes small. Also, it is difficult to conversely decrease the amount of movement of the outer and inner cylinders relative to each other with respect to movement obtained by helicoid.

SUMMARY OF THE INVENTION

The present invention has been made in order to solve the above drawbacks, and has an object to provide a moving mechanism for a cylinder in which the movement of inner and outer cylinders relative to each other can be freely set.

According to an aspect of the present invention, there is provided a moving mechanism in which a first helicoid thread is helically formed on an inner surface of a first cylinder, a second helicoid thread that threadably engages with the first helicoid thread of the first cylinder is helically formed on an outer surface of a second cylinder, and either one of the first and second cylinders is rotated with respect to the other cylinder, so the other cylinder is moved relative to one cylinder, wherein the moving mechanism includes a projection formed on the outer surface of the second cylinder, and a groove formed in the inner surface of the first cylinder and adapted to engage with the projection, the groove is formed parallel to the first helicoid thread in a range where the first and second helicoid threads threadably engage with each other upon movement of the first and second cylinders relative to each other, and has a nonparallel region not parallel to at least the first helicoid thread within a range where the first and second helicoid threads do not threadably engage with each other.

According to another aspect of the present invention, there is provided a moving mechanism in which a first helicoid thread is helically formed on an inner surface of a first cylinder, a second helicoid thread that threadably engages with the first helicoid thread of the first cylinder is helically formed on an outer surface of a second cylinder, and either one of the first and second cylinders is rotated with respect to the other cylinder, so the other cylinder is moved relative to one cylinder, wherein the moving mechanism includes a projection formed on the inner surface of the first cylinder, and a groove formed in the outer surface of the second cylinder and adapted to engage with the projection, the groove is formed parallel to the second helicoid thread in a range where the first and second helicoid threads threadably engage with each other upon movement of the first and second cylinders relative to each other, and has a nonparallel region not parallel to at least the second helicoid thread within a range where the first and second helicoid threads do not threadably engage with each other.

According to the present invention, a photographic lens is preferably accommodated in the first and second cylinders, and the moving mechanism is preferably used for a lens barrel for the photographic lens.

According to the present invention, the first and second cylinders engage with each other not only through the first and second helicoid threads but also through the projection and groove. Therefore, within the range where the first and second helicoid threads threadably engage with each other upon movement of the first and second cylinders relative to each other, the first and second cylinders can be precisely moved relative to each other through a helicoid mechanism comprised of the first and second helicoid threads. In the range where the first and second helicoid threads do not threadably engage with each other, the first and second cylinders can be moved relative to each other through the projection and groove by relative movement different from that by the helicoid mechanism. When a nonparallel region is formed in the groove, movement of the first and second cylinders relative to each other can be freely set.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 1:
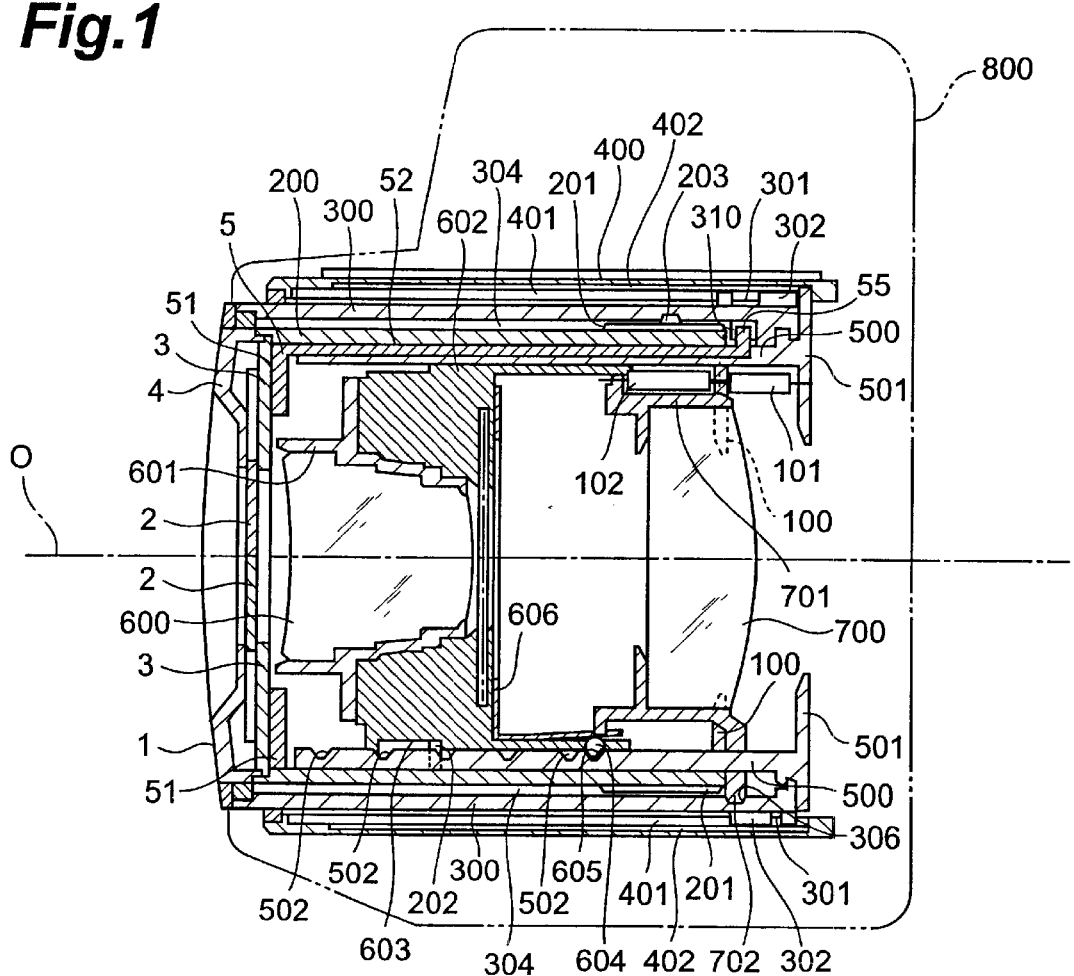
FIG. 1 is a sectional view of a lens barrel using a moving mechanism according to an embodiment of the present invention.

A preferred embodiment of the present invention will be described with reference to the accompanying drawings. In the drawings, the same elements are denoted by the same reference numerals, and a detailed description thereof will be omitted. Note that the dimensional proportions in the drawings do not necessary coincide with described ones.

A moving mechanism according to this embodiment is applied to a lens barrel for a photographic lens in a camera.

FIG. 1 is a sectional view of a lens barrel using the moving mechanism according to this embodiment. As shown in FIG. 1, the lens barrel has a movable cylinder 200 and intermediate cylinder 300. The movable cylinder 200 and intermediate cylinder 300 can be extended from and retracted in a camera body 800. The intermediate cylinder 300 is the first cylinder with two open ends, and is accommodated in a stationary cylinder 400 set in the camera body 800. The intermediate cylinder 300 has helicoid threads 301 and gear teeth 302 on the outer surface of its rear portion. For example, the helicoid threads 301 are formed as helical recesses and projections on the outer surface of the rear portion of the intermediate cylinder 300, and the large number of gear teeth 302 are formed between the projections of the helicoid threads 301 along the outer periphery.

The helicoid threads 301 threadably engage with helicoid threads 401 formed in the inner surface of the stationary cylinder 400. The gear teeth 302 mesh with a driving gear (not shown) set in the camera body 800. Therefore, when the driving gear rotates, the intermediate cylinder 300 rotates through the gear teeth 302 about an optical axis O as the center. When the intermediate cylinder 300 rotates, it moves along the optical axis O with respect to the stationary cylinder 400 because of the threadable engagement of the helicoid threads 301 and helicoid threads 401.

The intermediate cylinder 300 accommodates the movable cylinder 200. The movable cylinder 200 is the second cylinder that moves along the optical axis O in the same manner as the intermediate cylinder 300, and is arranged concentrically with the intermediate cylinder 300 about the optical axis O as the center. The movable cylinder 200 has second helicoid threads 201 serving as helical recesses and projections on the outer surface of its rear portion. The second helicoid threads 201 threadably engage with first helicoid threads 304 formed on the inner surface of the intermediate cylinder 300.

The movable cylinder 200 is locked by a straight moving cylinder 500. This prevents the movable cylinder 200 from rotating about the optical axis O, and allows it only to linearly move along the optical axis O. Therefore, when the intermediate cylinder 300 rotates, the movable cylinder 200 moves relative to the intermediate cylinder 300 along the optical axis O because of the threadable engagement of the first and second helicoid threads 304 and 201.

The straight moving cylinder 500 is a cylinder disposed inside the movable cylinder 200, and has a key 501 at its rear portion. The key 501 is locked by a vertical groove 402 formed in the inner surface of the stationary cylinder 400. This prevents the straight moving cylinder 500 from rotating about the optical axis O, and allows it only to move linearly along the optical axis O.

The rear end of the straight moving cylinder 500 engages with the intermediate cylinder 300 while rotation of the intermediate cylinder 300 is allowed. Thus, upon movement of the intermediate cylinder 300 in the direction of optical axis, the straight moving cylinder 500 does not rotate but moves linearly.

A front-group lens 600 and rear-group lens 700 are disposed inside the straight moving cylinder 500. The front-group lens 600 and rear-group lens 700 are lens groups that constitute an optical lens system.

The rear-group lens 700 is attached to a rear-group lens frame 701. The rear-group lens frame 701 engages with the straight moving cylinder 500 to be slidable in the direction of optical axis. The rear-group lens frame 701 forms cam followers 702 projecting outward from its side portion. The cam followers 702 extend through the straight moving cylinder 500 and movable cylinder 200 and are inserted in cam grooves 306 formed in the inner surface of the intermediate cylinder 300. Hence, when the intermediate cylinder 300 rotates, the rear-group lens 700 moves along the optical axis O to follow the cam grooves 306. The cam grooves 306 will be described later in detail.

The front-group lens 600 is attached to a front-group lens frame 601. The front-group lens frame 601 is connected to a shutter unit 602 and moves together with it. The shutter unit 602 is attached to the straight moving cylinder 500 to be slidable in the direction of optical axis.

A groove 603 extending in the direction of optical axis is formed in the side surface of the shutter unit 602. A projection 202 projecting from the inner wall of the movable cylinder 200 is inserted in the groove 603. Hence, the shutter unit 602 and front-group lens 600 are movable relative to the movable cylinder 200 for a distance corresponding to the length of the groove 603.

The shutter unit 602 has a click ball 604. The click ball 604 is a solid sphere for moving the front-group lens 600 together with the intermediate cylinder 300, and is arranged in an installation hole 605 extending through the rear portion of the shutter unit 602. The shutter unit 602 has a press member 606. The press member 606 serves as a biasing means for biasing the click ball 604 outward.

Recesses 502 for catching the click ball 604 are formed in the inner surface of the straight moving cylinder 500. The plurality of recesses 502 are formed at a constant interval along the optical axis.

A movable mask 100 is disposed inside the straight moving cylinder 500. The movable mask 100 is attached to the straight moving cylinder 500 to be movable in the direction of optical axis, and is biased by a spring 101 toward the proximal end. A spring 102 is provided between the movable mask 100 and rear-group lens frame 701, and biases the rear-group lens frame 701 toward the proximal end.

Figure 2:
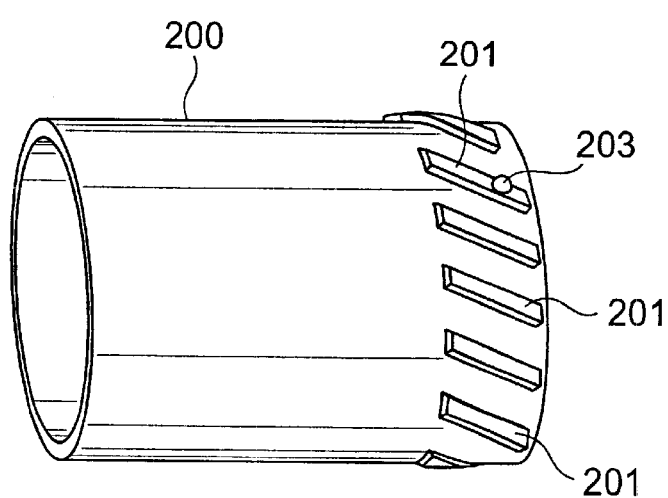
FIG. 2 is a view of a movable cylinder for the lens barrel of FIG. 1.

FIG. 2 is a perspective view of the movable cylinder.

As shown in FIG. 2, the plurality of second helicoid threads 201 as helical recesses and projections are formed on the outer surface of the rear portion of the movable cylinder 200 serving as the second cylinder. The second helicoid threads 201 form crests and roots helically. A projection 203 is formed on the crest of one second helicoid thread 201. The projection 203 projects upward from the crest of the second helicoid thread 201. Alternatively, the projection 203 may be formed on the root of one second helicoid thread 201. In this case, the projection 203 is higher than the crest of the second helicoid thread 201.

The helicoid threads of the stationary cylinder will be described in detail.

Figure 3:
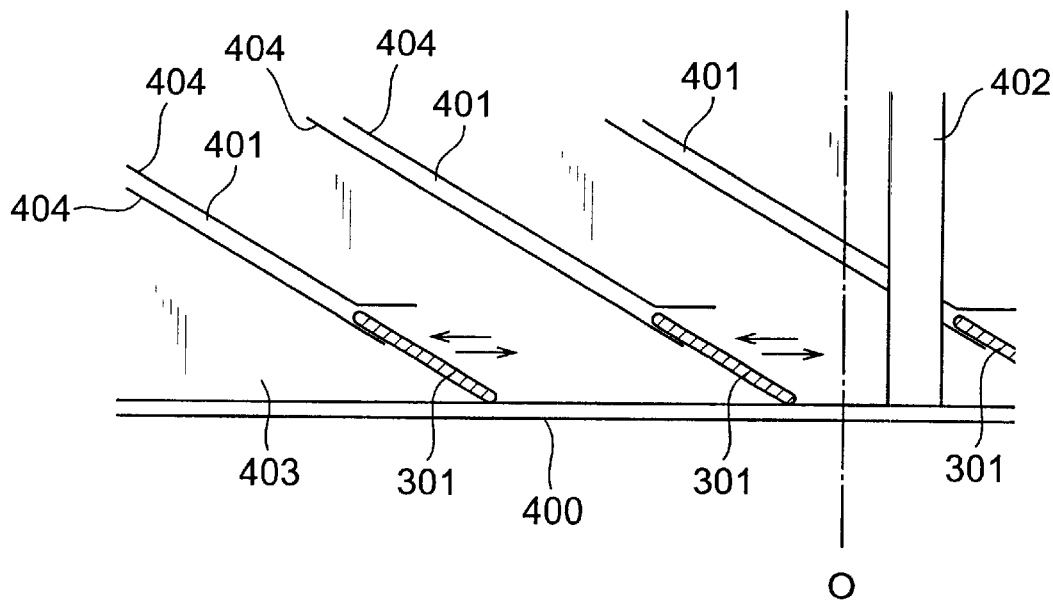
FIG. 3 is a view of the lens barrel of FIG. 1.

FIG. 3 is a partial developed view of the inner surface of the stationary cylinder 400. As shown in FIG. 3, the large number of helicoid threads 401 are formed on an inner surface 403 of the stationary cylinder 400 to be tilted with respect to the direction of the optical axis O, that is, to the optical axis. The helicoid threads 401 form elongated grooves to accommodate helicoid threads 301 of the intermediate cylinder 300, and guide the intermediate cylinder 300 in the direction of optical axis upon rotation of the intermediate cylinder 300.

The helicoid threads 401 are formed between parallel projecting ridges 404. At the end of each helicoid thread 401, only the projecting ridge 404 at the distal end side is formed perpendicularly to the optical axis.

Therefore, when the intermediate cylinder 300 is retracted into the stationary cylinder 400, the helicoid threads 301 are disengaged from the helicoid threads 401, and the intermediate cylinder 300 can rotate without movement in the direction of optical axis.

The cam grooves and helicoid threads of the intermediate cylinder will be described in detail.

Figure 4:
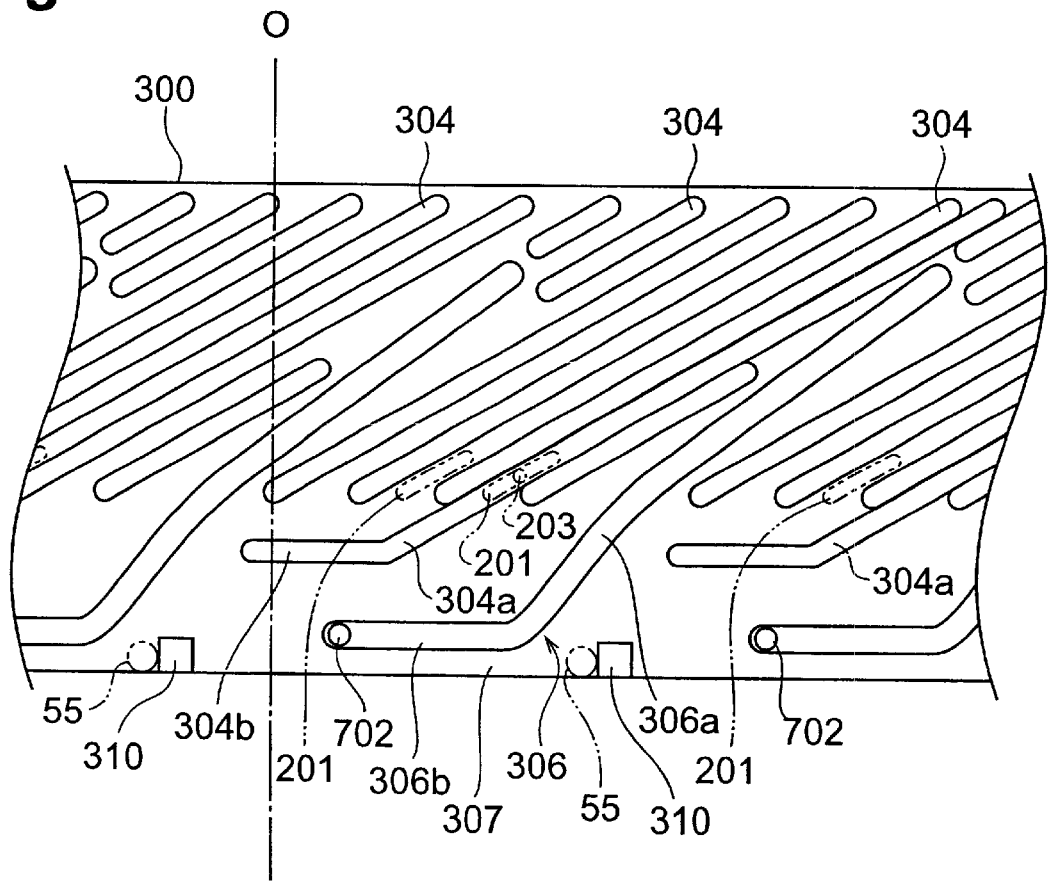
FIG. 4 is a view of a moving mechanism in the lens barrel of FIG. 1.

FIG. 4 is a partial developed view of the inner surface of the intermediate cylinder 300. As shown in FIG. 4, the large number of first helicoid threads 304 are formed in an inner surface 307 of the intermediate cylinder 300 to be tilted with respect to the direction of the optical axis O, i.e., to the optical axis. The first helicoid threads 304 form crests and roots helically, and threadably engage with the second helicoid threads 201 of the movable cylinder 200 to guide the movable cylinder 200 in the direction of optical axis.

Grooves 304a are formed in part of the roots of some first helicoid threads 304 which form the plurality of parallel crests and roots, to be deeper than corresponding portions of other roots. The grooves 304a are longer toward the proximal end than other first helicoid threads 304.

In a range where portions of other first helicoid threads 304 threadably engage with the second helicoid threads 201, the grooves 304a are formed parallel to these portions of other first helicoid threads 304. In a range where these portions of other first helicoid threads 304 and the second helicoid threads 201 do not threadably engage, i.e., in a range where these portions of other first helicoid threads 304 extend toward the proximal end, the grooves 304a have nonparallel regions 304b not parallel to these portions of other first helicoid threads 304.

The nonparallel regions 304b are formed at the proximal ends of the grooves 304a, and are bent in a direction perpendicular to the optical axis.

The second helicoid thread 201 with the projection 203 formed thereon is inserted in the corresponding groove 304a, and this groove 304a engages with the projection 203. In the presence of the projection 203, the second helicoid threads 201 are not disengaged from the deep grooves 304a.

The cam grooves 306 are formed in the inner surface 307. The cam grooves 306 guide movement of the rear-group lens 700, and accommodate cam followers 702 of the rear-group lens frame 701.

The cam grooves 306 have tilt regions 306a almost parallel to the first helicoid threads 304, and perpendicular regions 306b continuous to the proximal ends of the tilt regions 306a. The tilt regions 306a are regions for moving the rear-group lens 700 in the direction of optical axis upon rotation of the intermediate cylinder 300. The perpendicular regions 306b are regions formed perpendicularly to the optical axis. Even when the intermediate cylinder 300 rotates, the perpendicular regions 306b do not allow the rear-group lens 700 to move in the direction of optical axis.

When the movable cylinder 200 is retracted in the intermediate cylinder 300, the cam followers 702 of the rear-group lens frame 701 are located at the perpendicular regions 306b of the cam grooves 306. Thus, even when the intermediate cylinder 300 rotates, the rear-group lens 700 does not move relative to the intermediate cylinder 300.

The inner surface 307 has catching portions 310. The catching portions 310 serve to transmit the rotation force of the intermediate cylinder 300 to a ring 5 through projections 55, and project inward from the inner surface 307.

Figure 5:
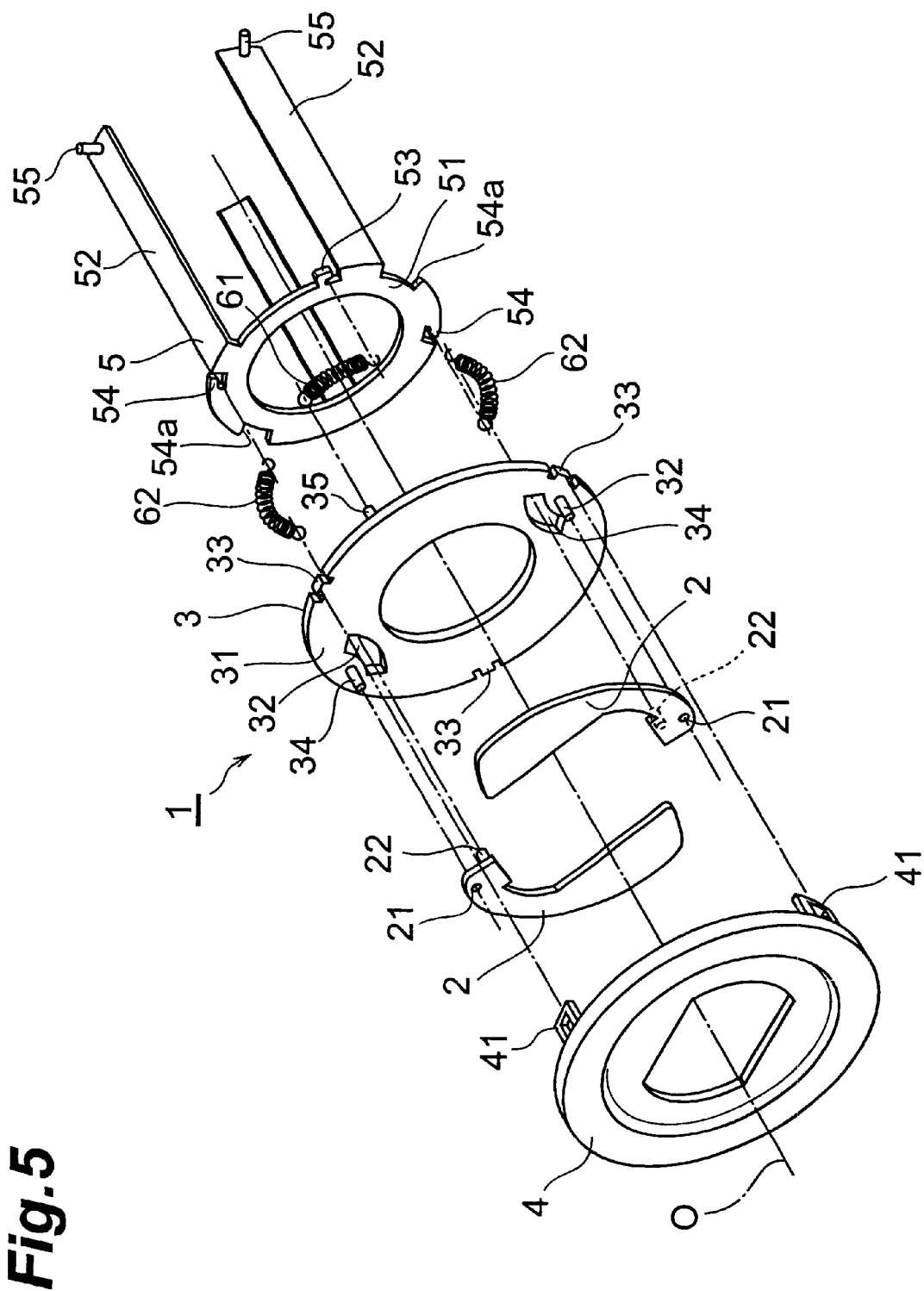
FIG. 5 is a view of a barrier opening/closing unit for the lens barrel of FIG. 1.

FIG. 5 is an exploded perspective view of a barrier opening/closing unit.

As shown in FIG. 5, a barrier opening/closing unit 1 has barriers 2 for opening/closing the distal-end opening of the photographing optical system. The barriers 2 are arranged symmetrically with respect to the optical axis O of the photographing optical system as the center, and are rotatably attached to a barrier main body 3. For example, the barriers 2 have through holes 21 extending through them, and axial pins 32 projecting from a surface 31 of the barrier main body 3 are inserted in the through holes 21. Hence, the barriers 2 are rotatable about the corresponding axial pins 32 as the centers, thereby opening/closing the barriers 2.

Catching portions 33 are formed in the outer edge of the barrier main body 3. The catching portions 33 serve to catch a front cover 4 attached to the upper surface of the barrier main body 3. For example, the catching portions 33 are formed of projections obtained by notching the outer edge of the barrier main body 3, and catch cached portions 41 of the front cover 4.

Openings 34 are formed in those portions of the barrier main body 3 which are in the vicinities of the axial pins 32. The openings 34 are holes extending from the upper surface through the lower surface of the barrier main body 3, and allow pins 22 formed on the rear surfaces of the barriers 2 to extend through them.

The ring 5 is arranged on the rear side of the barrier main body 3. The ring 5 serves to open/close the barriers 2 when it rotates about the optical axis O as the center, and has a ring portion 51 forming a ring-like shape. The ring portion 51 is rotatably attached to the rear side of the barrier main body 3, and has first and second hooks 53 and 54 at its outer edge.

One end of a coil spring 61 is caught by the first hook 53. The other end of the coil spring 61 is caught by a pin 35 extending from the rear surface of the barrier main body 3. With the contracting force of the coil spring 61, the ring 5 is biased in a constant direction, e.g., counterclockwise about the optical axis O as the center.

One end of each coil spring 62 is caught by the corresponding second hook 54. The other end of each coil spring 62 is caught by the pin 22 of the corresponding barrier 2 which extends through the barrier main body 3. When the coil spring 61 biases the ring 5 to rotate counterclockwise, the other end face 54a with the hook-shaped portion of each second hook 54 abuts against the corresponding pin 22 to urge it, thereby opening the corresponding barrier 2. When the ring 5 rotates clockwise against the biasing force of the coil spring 61, the pins 22 are pulled by the contracting forces of the coil springs 62 to elastically close the barriers 2.

Rotation force transmitting portions 52 are formed on the outer edge of the ring portion 51 of the ring 5. The rotation force transmitting portions 52 transmit the rotation force from the lens barrel to the ring portion 51, and are formed integrally with the ring portion 51 to constitute band-like bodies extending from the ring portion 51 backward parallel to the optical axis O. The rotation force transmitting portions 52 are not limited to band-like bodies, but may have rod-like shapes or other shapes.

The rotation force transmitting portions 52 are formed three almost equidistantly on the outer circumference of the ring portion 51. Regarding the number of rotation force transmitting portions 52, two or more rotation force transmitting portions 52 are preferably formed equidistantly so the ring portion 51 can be rotated stably.

Projections 55 are formed on the outer surfaces of the distal ends of the rotation force transmitting portions 52. The projections 55 are caught by the lens barrel.

The barrier opening/closing unit 1 is set such that the barriers 2 are located at the distal end of the movable cylinder 200, as shown in FIG. 1. The rotation force transmitting portions 52 of the ring 5 are arranged along the inner surface of the movable cylinder 200. The projections 55 formed on the distal ends of the rotation force transmitting portions 52 abut against the catching portions 310 formed on the inner surface of the intermediate cylinder 300.

The operation of the lens barrel using the moving mechanism according to this embodiment will be described.

As shown in FIG. 1, when the main switch of the camera body 800 is OFF, the intermediate cylinder 300 has been retracted in the stationary cylinder 400, and the movable cylinder 200 has been retracted in the intermediate cylinder 300. At this time, the projections 55 of the rotation force transmitting portions 52 have been rotated by the catching portions 310 of the intermediate cylinder 300 clockwise when seen from the front side of the camera. Hence, the ring 5 is rotated clockwise through the projections 55 and rotation force transmitting portions 52, and the barriers 2 are closed through the coil springs 62.

When the main switch of the camera is turned on, the intermediate cylinder 300 rotates counterclockwise when seen from the front side. Along with this rotation, the ring 5 that has been rotated by the intermediate cylinder 300 through the projections 55 and rotation force transmitting portions 52 is allowed to rotate. When the intermediate cylinder 300 rotates, the ring 5 also rotates counterclockwise. Rotation of the ring 5 opens the barriers 2.

Even when the intermediate cylinder 300 rotates, if the rotation is within a range of a predetermined rotation or less, the intermediate cylinder 300 is not extended from the stationary cylinder 400, and the movable cylinder 200 is not extended from the intermediate cylinder 300. More specifically, as shown in FIG. 3, even when the intermediate cylinder 300 rotates, if the helicoid threads 301 of the intermediate cylinder 300 do not threadably engage with the helicoid threads 401 of the stationary cylinder 400, the intermediate cylinder 300 is not extended from the stationary cylinder 400. As shown in FIG. 4, even when the intermediate cylinder 300 rotates, if the projection 203 of the movable cylinder 200 is located at the nonparallel region 304b of a groove 304a of the intermediate cylinder 300, the movable cylinder 200 is not extended from the intermediate cylinder 300.

Therefore, when the intermediate cylinder 300 rotates, the barriers 2 can be opened without extending the intermediate cylinder 300 and movable cylinder 200, enabling photographing at the WIDE end.

In this state, when zoom operation is performed by the camera body 800, the intermediate cylinder 300 further rotates to be extended from the stationary cylinder 400, and the movable cylinder 200 is extended from the intermediate cylinder 300. This enables telescopic photography. To end use of the camera, in response to operation of the camera body 800, the intermediate cylinder 300 rotates in the opposite direction and is retracted in the stationary cylinder 400, and the movable cylinder 200 is retracted in the intermediate cylinder 300.

Figure 6:
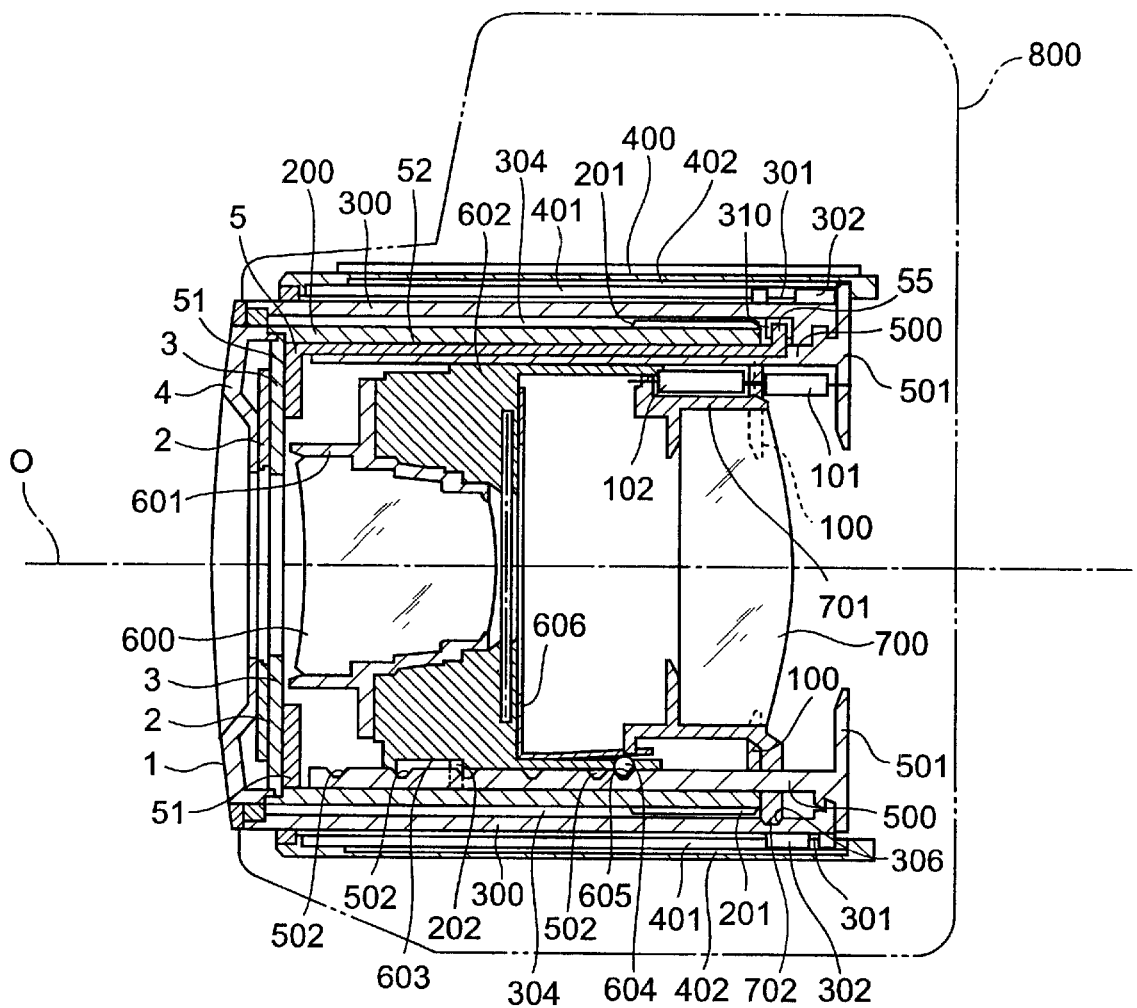
FIG. 6 is a view for explaining the operation of the lens barrel of FIG. 1.

As shown in FIG. 6, when the intermediate cylinder 300 is completely retracted in the stationary cylinder 400 and the movable cylinder 200 is completely retracted in the intermediate cylinder 300, the intermediate cylinder 300 and movable cylinder 200 do not move in the direction of optical axis, but only the intermediate cylinder 300 rotates.

At this time, the catching portions 310 of the intermediate cylinder 300 abut against the projections 55, to rotate them clockwise. Therefore, the ring 5 rotates clockwise through the projections 55 and rotation force transmitting portions 52. Upon rotation of the ring 5, the barriers 2 are closed.

According to this lens barrel, when the intermediate cylinder 300 rotates, its rotation force is directly transmitted to the ring 5 through the rotation force transmitting portions 52. Therefore, to rotate the ring 5, no constituent components such as a lever separate from the ring 5 need be provided, and the number of constituent components of the apparatus can be reduced. Accordingly, the component cost can be reduced. Since the number of components can be reduced, the apparatus can be easily assembled during the manufacture, reducing the manufacturing cost as well.

Since the ring 5 has the plurality of rotation force transmitting portions 52, the rotation force of the ring 5 is transmitted by them. This rotation force transmission smoothly rotates the ring 5 without being tilted. Therefore, the barriers can be opened/closed smoothly.

As described above, according to the movable mechanism of this embodiment, the intermediate cylinder 300 as the first cylinder and the movable cylinder 200 as the second cylinder engage with each other not only through the first and second helicoid threads 304 and 201 but also through the projection 203 and groove 304a. In a range where the first and second helicoid threads 304 and 201 threadably engage with each other upon movement of the intermediate cylinder 300 and movable cylinder 200 relative to each other, the intermediate cylinder 300 and movable cylinder 200 can be precisely moved relative to each other through the helicoid mechanism comprised of the first and second helicoid threads 304 and 201. In a range where the first and second helicoid threads 304 and 201 do not threadably engage with each other, the intermediate cylinder 300 and movable cylinder 200 can be moved relative to each other through the projection 203 and groove 304a by relative movement different from that by the helicoid mechanism.

In this case, in a range where the first and second helicoid threads 304 and 201 do not threadably engage with each other, if the grooves 304a are formed as required, movement of the intermediate cylinder 300 and movable cylinder 200 relative to each other can be set freely. Therefore, the amount of movement of the intermediate cylinder 300 and movable cylinder 200 relative to each other can be increased or decreased with respect to rotation of the intermediate cylinder 300, or can be set to zero.

This embodiment exemplifies a moving mechanism in which the projection 203 is formed on the outer surface of the movable cylinder 200 and the grooves 304a are formed in the inner surface of the intermediate cylinder 300. However, a moving mechanism according to the present invention is not limited to this, but can be a moving mechanism in which a projection 203 is formed on the inner surface of an intermediate cylinder 300 and grooves 304a are formed in the outer surface of a movable cylinder 200.

Even in this case, the operation and effect similar to those of the moving mechanism according to the above embodiment can be obtained.

In the above embodiment, the nonparallel regions 304b of the first helicoid threads 304 and the perpendicular regions 306b of the cam grooves 306 are perpendicular to the optical axis O. However, the nonparallel regions 304b and region 306b need not be perpendicular to the optical axis O, but may be tilted with respect to the optical axis O as required in accordance with the shape of the barrel. Even in this case, the operation and effect similar to those of the moving mechanism according to the above embodiment can be obtained.

In this embodiment, the moving mechanism according to the present invention is applied to a lens barrel for a photographic lens in a camera. However, a moving mechanism according to the present invention is not limited to this, but can be applied to any other mechanism as far as it is a moving mechanism for moving a plurality of inner and outer cylinders provided in a multiple manner in the axial direction relative to each other.

As has been described above, according to the present invention, the first and second cylinders engage with each other not only through the first and second helicoid threads but also through a projection and groove. Therefore, in a range where the first and second helicoid threads threadably engage with each other upon movement of the first and second cylinders relative to each other, the first and second cylinders can be precisely moved relative to each other through a helicoid mechanism comprised of the first and second helicoid threads, and in a range where the first and second helicoid threads do not threadably engage with each other, the first and second cylinders can be moved relative to each other through the projection and groove by relative movement different from that by the helicoid mechanism. In this case, in the region where the first and second helicoid threads do not threadably engage with each other, if grooves are formed as required, movement of the first and second cylinders relative to each other can be set freely.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A moving mechanism comprising:
   a first helicoid thread on an inner surface of a first cylinder,
   a second helicoid thread threadedly engaging the first helicoid thread on an outer surface of a second cylinder, wherein when one of the first and second cylinders is rotated with respect to the other, the other is moved relative to the cylinder that is rotated, and
   a moving mechanism including:
      a projection on the outer surface of the second cylinder, and
      a groove in the inner surface of the first cylinder for engaging the projection, wherein the groove is parallel to the first helicoid thread in a range where the first and second helicoid threads threadedly engage each other upon movement of the first and second cylinders relative to each other, and has a nonparallel region not parallel to at least the first helicoid thread within a range where the first and second helicoid threads do not threadedly engage each other.

2. A moving mechanism comprising:
   a first helicoid thread on an inner surface of a first cylinder,
   a second helicoid thread threadedly engaging the first helicoid thread on an outer surface of a second cylinder, wherein when one of the first and second cylinders is rotated with respect to the other, the other is moved relative to the cylinder that is rotated, and
   a moving mechanism including:
      a projection on the inner surface of the first cylinder, and
      a groove in the outer surface of the second cylinder for engaging the projection, wherein the groove is parallel to the second helicoid thread in a range where the first and second helicoid threads threadedly engage each other upon movement of the first and second cylinders relative to each other, and has a nonparallel region not parallel to at least the second helicoid thread within a range where the first and second helicoid threads do not threadedly engage each other.

3. The moving mechanism according to claim 1, including a photographic lens accommodated in the first and second cylinders, and said moving mechanism is a lens barrel for the photographic lens.

4. The moving mechanism according to claim 2, including a photographic lens accommodated in the first and second cylinders, and said moving mechanism is a lens barrel for the photographic lens.

* * * * *